US011965380B2

(12) United States Patent
Enochs

(10) Patent No.: US 11,965,380 B2
(45) Date of Patent: Apr. 23, 2024

(54) IDLER BRACKET FOR ROLLER SHADE

(71) Applicant: Draper, Inc., Spiceland, IN (US)

(72) Inventor: Steven E. Enochs, New Palestine, IN (US)

(73) Assignee: Draper, Inc., Spiceland, IN (US)

(*) Notice: Subject to any disclaimer, the term of this patent is extended or adjusted under 35 U.S.C. 154(b) by 252 days.

(21) Appl. No.: 17/472,107

(22) Filed: Sep. 10, 2021

(65) Prior Publication Data

US 2023/0092202 A1 Mar. 23, 2023

(51) Int. Cl.
*E06B 9/42* (2006.01)

(52) U.S. Cl.
CPC .................................. *E06B 9/42* (2013.01)

(58) Field of Classification Search
CPC .... A47H 1/13; A47H 1/14; A47H 1/12; E06B 9/42
USPC ..................................................... 248/269
See application file for complete search history.

(56) References Cited

U.S. PATENT DOCUMENTS 1,099,360 A * 6/1914 Harris ...................... E06B 9/42 160/300
1,476,160 A 12/1923 Kirsch
2,013,500 A * 9/1935 O'Connor ................ E06B 9/50 248/269
2,460,360 A * 2/1949 Paradis .................... A47H 1/13 248/254
2,486,996 A 11/1949 Stuber et al.
2,524,711 A 10/1950 Nelson
2,974,918 A 3/1961 Voigtlander
3,005,615 A 10/1961 Mckay
3,102,584 A 9/1963 Znamirowski
4,179,091 A 12/1979 Bidney
4,223,714 A * 9/1980 Weinreich ................ E06B 9/78 160/319
4,224,974 A 9/1980 Anderson et al.
4,270,720 A * 6/1981 Fukuchi ................. A47H 1/142 248/257
4,399,855 A 8/1983 Volfson
4,453,688 A 6/1984 Nakajima et al.
4,538,785 A * 9/1985 Damsgaard ............... E06B 9/50 248/268
4,572,467 A 2/1986 Farrell
4,711,437 A 12/1987 Longenecker et al.
4,738,420 A 4/1988 Angle et al.
(Continued)

FOREIGN PATENT DOCUMENTS

AU 662030 B2 8/1995
CA 2613690 A1 6/2008
(Continued)

OTHER PUBLICATIONS

MechoSystems—Manual Shades, Mecho®/5 DoubleShades®, MechoShade Systems, Inc., http://www.mechoshade.com/manualshades/doubleshades.php, retrieved Jun. 6, 2018, 15 pages.

*Primary Examiner* — Kimberly T Wood
(74) *Attorney, Agent, or Firm* — Faegre Drinker Biddle & Reath LLP

(57) ABSTRACT

The present disclosure relates to a system for supporting an idler end of a roller clutch assembly for a fabric covering configured to rotate about an axis comprising a support assembly configured to receive and secure the idler end to the system during rotation.

22 Claims, 14 Drawing Sheets

(56) References Cited

U.S. PATENT DOCUMENTS

| | | | | |
|---|---|---|---|---|
| 4,884,618 | A | 12/1989 | Steeves | |
| 5,189,758 | A * | 3/1993 | Levy | A47H 15/02 16/95 D |
| 5,195,570 | A | 3/1993 | Marocco | |
| 5,609,196 | A | 3/1997 | Kraler | |
| 5,857,653 | A * | 1/1999 | Dujlovich | E06B 9/42 160/294 |
| 5,997,597 | A | 12/1999 | Hagan | |
| 6,196,508 | B1 * | 3/2001 | Nijs | A47H 1/13 248/267 |
| 6,643,945 | B1 | 11/2003 | Starks | |
| 6,782,938 | B2 | 8/2004 | Colson et al. | |
| 6,935,401 | B2 | 8/2005 | Fraczek et al. | |
| 7,854,419 | B2 | 12/2010 | Ng et al. | |
| 7,891,399 | B2 | 2/2011 | Rasmussen | |
| 8,122,932 | B2 | 2/2012 | Cannaverde | |
| 8,151,859 | B2 | 4/2012 | Koop et al. | |
| 8,201,789 | B1 | 6/2012 | Chou | |
| 8,382,050 | B2 | 2/2013 | Koop | |
| 8,403,289 | B1 | 3/2013 | Rinderer | |
| 8,608,126 | B2 | 12/2013 | Ng et al. | |
| 8,672,115 | B1 * | 3/2014 | Jennings | F16D 49/02 192/223.4 |
| 8,967,227 | B2 | 3/2015 | Chou | |
| 9,138,093 | B1 | 9/2015 | Chou | |
| 9,303,707 | B2 | 4/2016 | Fraczek | |
| D758,985 | S | 6/2016 | Jennings et al. | |
| 10,221,621 | B2 | 3/2019 | Marcinik et al. | |
| 10,323,793 | B2 * | 6/2019 | Daniels | A47H 1/13 |
| 10,544,621 | B2 * | 1/2020 | Mocanu | E06B 9/78 |
| 10,704,324 | B2 * | 7/2020 | Goldberg | E06B 9/50 |
| 10,968,695 | B2 * | 4/2021 | Chen | E06B 9/50 |
| D948,893 | S * | 4/2022 | Konopelski | D6/580 |
| 11,591,853 | B2 * | 2/2023 | Miroshnichenko | E06B 9/78 |
| 11,649,671 | B2 * | 5/2023 | Geiger | A47H 1/13 248/639 |
| 2006/0005767 | A1 | 1/2006 | Tsai et al. | |
| 2006/0272782 | A1 | 12/2006 | Nichols et al. | |
| 2008/0121353 | A1 | 5/2008 | Detmer et al. | |
| 2009/0308543 | A1 | 12/2009 | Kates | |
| 2010/0200179 | A1 | 8/2010 | DiStefano | |
| 2010/0288451 | A1 | 11/2010 | Bohlen | |
| 2011/0006176 | A1 | 1/2011 | Krantz-Lilienthal | |
| 2011/0139381 | A1 | 6/2011 | Daniels | |
| 2011/0139382 | A1 | 6/2011 | Daniels | |
| 2012/0090795 | A1 | 4/2012 | Kirby | |
| 2012/0160975 | A1 | 6/2012 | Cannaverde | |
| 2013/0098561 | A1 * | 4/2013 | Mullet | E06B 9/50 160/39 |
| 2013/0105649 | A1 | 5/2013 | Wills et al. | |
| 2013/0284383 | A1 | 10/2013 | Feldstein et al. | |
| 2013/0312920 | A1 | 11/2013 | Mullet et al. | |
| 2014/0166218 | A1 | 6/2014 | Ng | |
| 2014/0174678 | A1 | 6/2014 | Chou | |
| 2014/0262067 | A1 | 9/2014 | Higgins et al. | |
| 2014/0262081 | A1 * | 9/2014 | Seib | E06B 9/44 160/405 |
| 2014/0299729 | A1 | 10/2014 | Wills | |
| 2015/0027059 | A1 | 1/2015 | Lu et al. | |
| 2015/0337595 | A1 | 11/2015 | Seib | |
| 2019/0024452 | A1 * | 1/2019 | Derk, Jr. | E06B 9/42 |
| 2020/0123847 | A1 * | 4/2020 | Konopelski | E06B 9/50 |
| 2020/0131849 | A1 * | 4/2020 | Campagna | H02K 29/08 |
| 2020/0248504 | A1 | 8/2020 | Risher | |
| 2021/0131179 | A1 * | 5/2021 | Campagna | E06B 9/72 |

FOREIGN PATENT DOCUMENTS

| | | | | |
|---|---|---|---|---|
| CA | 2902473 | A1 | 2/2017 | |
| DE | 10337662 | A1 * | 4/2004 | B60J 1/2063 |
| EP | 0026347 | A1 * | 4/1981 | |
| EP | 0032884 | A1 * | 7/1981 | |

* cited by examiner

IDLER BRACKET FOR ROLLER SHADE

FIELD OF THE DISCLOSURE

The present disclosure relates to a roller shade support, more particularly, to an roller shade support to engage an idler end of a roller shade.

BACKGROUND

Window coverings are typically provided to block ambient light from entering a room. Some window coverings have rollers about which the fabric cover is wound and which allow for the fabric cover to be positioned at any level with respect to the window. The roller may have an idler end supported relative to an environmental feature, such as a wall or window casing with a support which secures the idler end and permits movement of the roller shade.

SUMMARY

In one form thereof, the present disclosure provides a system for supporting an idler end of a roller shade which is rotatable about a longitudinal axis, the system comprising: a support assembly configured to receive and secure the idler end, the support assembly comprising: a support having a through channel extending from a first side of the support to a second side of the support; and a securing element received with an opening in the support, the securing element configured to translate between a closed position and an open position, the securing element including a front protrusion having a pair of forward protrusions configured to be received within the through channel when the securing element is in the closed position and a pair of slanted surface extending from a position adjacent a lower, rear surface of the pair of forward protrusions, wherein a forward face of the slanted surfaces is spaced rearwardly of a forward face of the forward protrusions; and a mounting assembly coupled to the support assembly.

In exemplifications thereof, the opening is in a rear surface of the support. In alternative exemplifications, the support includes a pair of channels configured to receive the pair of forward protrusions when the securing element is in the open position. In certain further exemplifications, the pair of channels extend upward from the through channel. In certain additional exemplifications, the pair of slanted surfaces are positioned within the through channel when the securing element is in the closed position.

In exemplifications thereof, at least a majority of the pair of slanted surfaces is configured to be positioned above an upper surface of the through channel when the securing element is in the open position.

In exemplifications thereof, the support further includes a retention channel, at least a portion of the retention channel extending downward from the through channel, the pair of forward protrusions being positioned on either side of the retention channel. In certain further exemplifications, the support assembly further includes an idler end support configured to support the idler end in the retention channel.

In exemplifications thereof, the support assembly further includes a biasing member configured to bias the support into the closed position.

In exemplifications thereof, the pair of slanted surfaces extend laterally outward and upward.

In another form thereof, the present disclosure provides a system for supporting an idler end of a roller clutch assembly for a fabric covering configured to rotate about an axis, the system comprising: a support assembly configured to receive and secure the idler end, the support assembly comprising: a support having a guide member and a through channel, the guide member defining at least a portion of a retention channel; and a securing element received with an opening in the support and configured to translate between a closed position and an open positioned, the securing element including a pair of forward protrusions configured to be received within the through channel when the securing element is in the closed position, wherein the retention channel is formed by the guide member, the pair of forward protrusions, and an upper surface of the through channel when the securing element is in the closed position; and a mounting assembly coupled to the support assembly.

In exemplifications thereof, an inner surface of each of the pair of forward protrusions is spaced laterally outward from an inner surface of a portion of the retention channel defined by the guide member.

In exemplifications thereof, at least a portion of the pair of forward protrusions is positioned above the through channel when the securing element is in the open position.

In exemplifications thereof, the system further comprises a biasing member biasing the securing element in the closed position.

In exemplifications thereof, the system further comprises an idler end support positioned within the retention channel.

In exemplifications thereof, the system further comprises an adjustment member configured to adjust a vertical position of the idler end support within the retention channel.

In another form thereof, the present disclosure provides a method of securing an idler end of a roller shade within a housing assembly, the method comprising: translating the idler end within a channel of the housing assembly towards a retention channel of the housing assembly; contacting a slant surface of a securing element of the housing assembly with the idler end; translating the idler end between the slant surface and a lower surface of the channel to transition the securing element into an open position; translating the idler end below the slant surface when the securing element is in the open position; positioning the idler end within the retention channel; and biasing the securing element into a closed position once the idler end is past the slant surface.

In exemplifications thereof, the channel of the housing assembly includes a through channel extending from a first side of the housing assembly to a second side of the housing assembly.

In exemplifications thereof, the channel includes a first portion extending in a generally vertical direction and a second portion extending in a generally horizontal direction.

In exemplifications thereof, the retention channel extends in a generally vertical direction.

Additional features and advantages will become apparent to those skilled in the art upon consideration of the following detailed description.

BRIEF DESCRIPTION OF THE DRAWINGS

Advantages and features of the embodiments of this disclosure will become more apparent from the following detailed description of exemplary embodiments when viewed in conjunction with the accompanying drawings, wherein.

Figure 1:
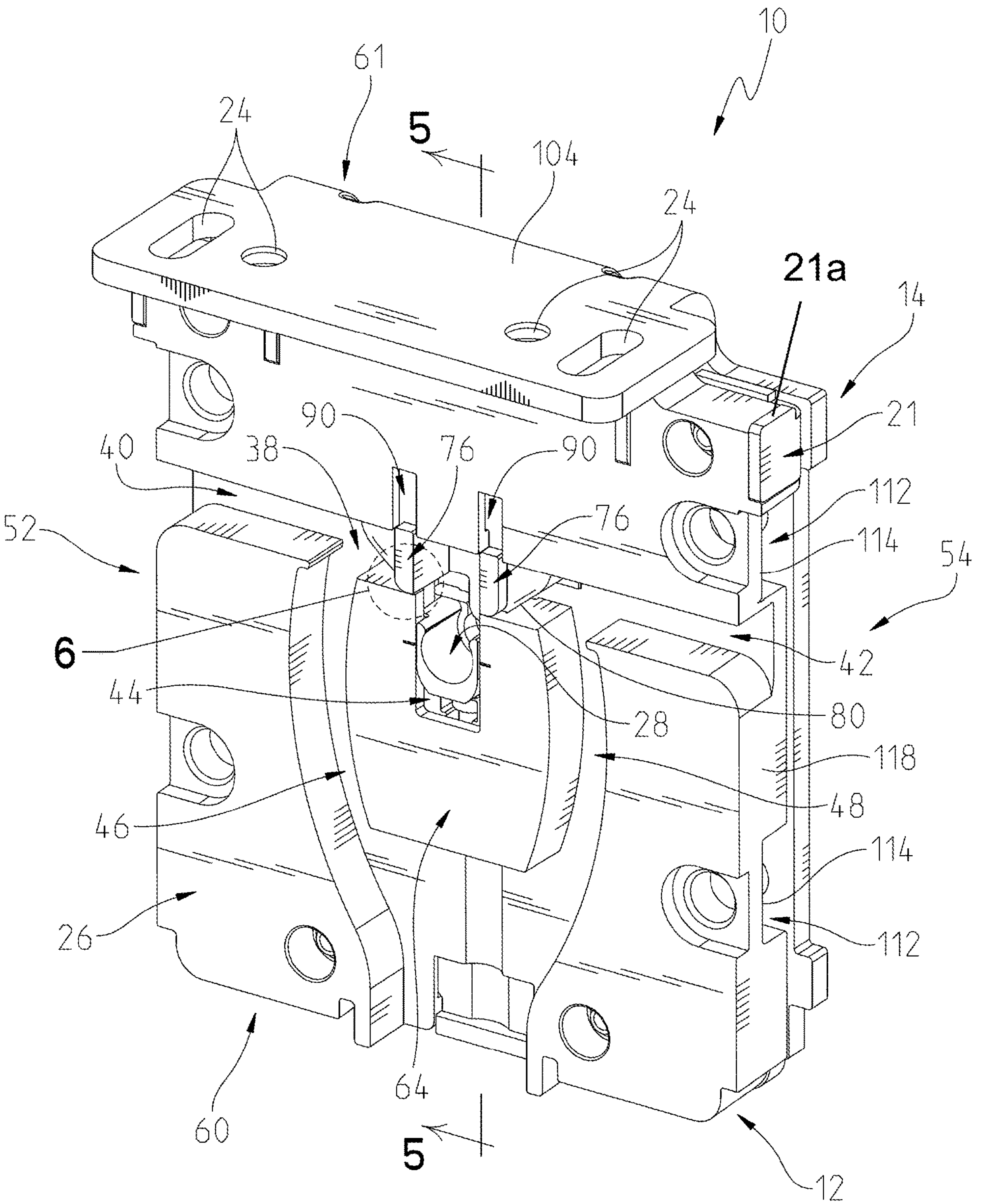
FIG. 1 is a front perspective view of a housing assembly of the present disclosure configured to receive and support an idler end of a roller shade.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate embodiments of the disclosure, in one form, and such exemplifications are not to be construed as limiting the scope of the disclosure in any manner.

DETAILED DESCRIPTION OF THE DRAWINGS

Figure 2:
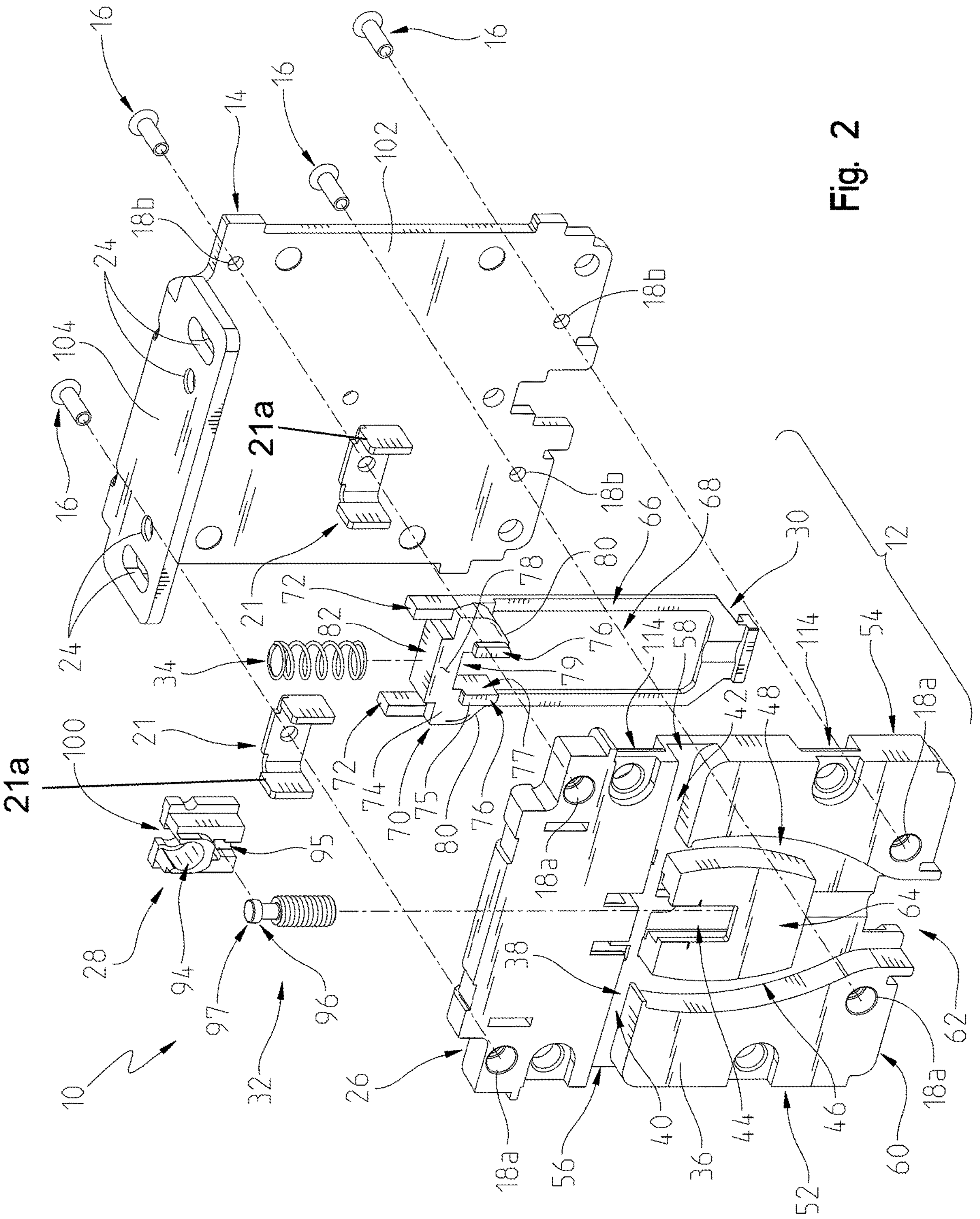
FIG. 2 is a front exploded view of the housing assembly of FIG. 1.

Referring to FIGS. 1-12, a housing assembly 10 for supporting an idler end, and more specifically a pin 50 of an idler end of a roller shade is provided. Housing assembly 10 generally includes a support assembly 12 and a mounting assembly 14. Support assembly 12 and mounting assembly 14 are coupled together by a plurality of couplers 16 (FIGS. 2 and 3) which are received through openings 18*b* of mounting assembly 14 and into openings 18*a* of support assembly 12. In certain embodiments, couplers 16 may removably couple support assembly 12 and mounting assembly 14. In alternative embodiments, couplers 16 may comprise rivets. In this way, a head 16*a* of couplers 16 is positioned along an innermost surface of mounting assembly 14 such that they are not visible when housing assembly 10 is mounted to a wall, window casing, or other similar surface. Mounting assembly 14 is also retained on support assembly 12 using locators, illustratively pins 20 (FIG. 3), projecting from support assembly 12 towards mounting assembly 14. More particularly, pins 20 are received within openings 22 on mounting assembly 14. As such, support assembly 12 and mounting assembly 14 are coupled together through couplers 16 and pins 20. In various embodiments, housing assembly 10 may further include spacers 21 positioned between upper corners of support assembly 12 and mounting assembly 14. Spacers 21 provide tabs 21*a* (FIGS. 1 and 2) sitting proud of an upper surface of support assembly 12 and mounting assembly 14 as illustrated in FIG. 1. As shown in FIG. 1, the upper surfaces above which tabs extend are not the upper most surfaces of support assembly 12 and mounting assembly 14. For example, fixed bracket portion 104 extends above tabs 21*a*. As described in further detail below, fixed bracket portion 104 functions to secure housing assembly 10 to a wall or window casing. With tabs 21*a* vertically spaced from fixed bracket portion 104, a fascia extrusion which acts as a cover to hide the shade roller assembly can be positioned under fixed bracket portion 104, with tabs 21*a* serving as an anchor for the fascia extrusion. Particularly, tabs 21*a* can engage a slot or groove in the fascia extrusion to index and anchor the fascia extrusion relative to housing assembly 10. This anchoring secures the fascia to the idler bracket throughout the range of motion of the shade secured thereto. In FIG. 2, the operable tab 21*a* is labelled. Each spacer 21 includes a pair of tabs to allow a single spacer to be used in either of the two positions relative to the housing assembly. The various components of housing assembly 10 may be comprised of a rigid material, such as a rigid polymeric and/or metallic material.

Figure 3:
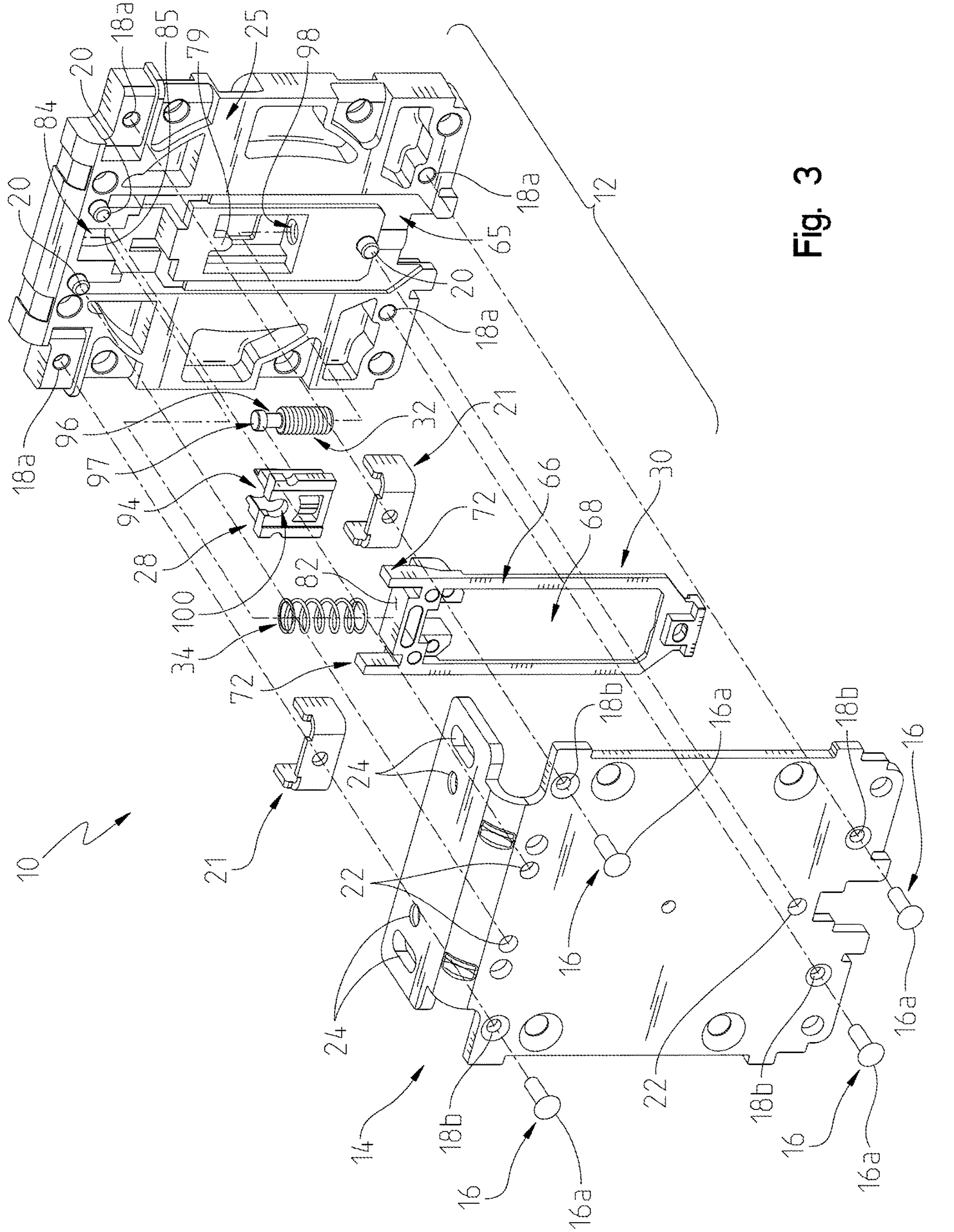
FIG. 3 is a rear exploded view of the housing assembly of FIG. 1.

With reference to FIGS. 2 and 3, support assembly 12 generally includes a support 26, an idler pin support 28, a securing element 30, a height adjusting screw 32, and a biasing member 34, where height adjusting screw 32 is configured to adjust the positioning of idler pin support 28, and biasing member 34 is configured to bias securing element 22 downward, as disclosed further hereinafter.

Still referring to FIGS. 2 and 3, support 26 generally includes a body 36 having a plurality of channels 38, 40, 42, 44, 46, 48 formed therein to receive pin 50 (FIGS. 5 and 9A-D) of the idler end of the roller shade. Illustratively, support 26 includes a through channel 38 having a first channel 40 extending inwardly from a first side 52 of support 26 and a second channel 42 extending inwardly from a second side 54 of support 26. In this way, pin 50 may be positioned in either of first or second channels 40, 42, depending on the position of housing 10 relative to the window casing, wall, etc. Pin 50 can therefore be positioned at a laterally outer opening 56, 58, respectively, of either of channels 40, 42 to move or slide inwardly towards a retention channel 44 configured to maintain the position of pin 50 therein. In one embodiment, retention channel 44 extends vertically and generally perpendicularly to through channel 38 between first and second channels 40, 42, however, in other embodiments, retention channel 44 may have a different orientation or configuration.

Additionally, and still referring to FIGS. 2 and 3, depending on the position of housing assembly 10 relative to the window casing, wall, or other structure, it may be necessary to join pin 50 with housing assembly 10 from a third end 60 of support 26. More particularly, third end 60 may include an opening 62 which feeds into a third channel 46 and a fourth channel 48. In one embodiment, third and fourth channels 46, 48 extend in a generally vertical direction and open into first and second channels 40, 42, respectively. Third and fourth channels 46, 48 are defined by a protrusion or guide member 64, which also defines retention channel 44. Illustratively, guide member 64 is positioned laterally intermediate third and fourth channels 46, 48 and vertically intermediate opening 62 and openings 56 and 58 of first and second channels 42, respectively.

If the user or installer chooses to insert pin 50 into housing assembly 10 using opening 62, pin 50 may move through opening 62 and into either third or fourth channel 46, 48 before being received within respective first or second channel 40, 42 and then moved downwardly into retention channel 44.

With reference to FIGS. 2, 3, 7, and 8, in order to retain pin 50 within retention channel 44 of support 26, support assembly 12 includes securing element 30 and biasing member 34. Securing element 30 is configured to be positioned within an opening 65 (FIG. 3) of a rear surface 25 of support 26 and generally includes a body 66 having an opening 68, a forward protrusion 70, and upward-extending protrusions 72. Forward protrusion 70 generally includes a main portion 74 and two front protrusions 76 extending from a forward face 78 of main portion 74, where protrusions 76 have a height similar to that of through channel 38 and are positioned within through channel 38 on either side of retention channel 44, such that retention channel 44 extends upward between a portion of an upper surface 79 of through channel 38 and inner surfaces 77 of protrusions 76 when housing assembly 10 is in a closed position. As such, housing assembly 10 is configured to retain pin 50 within retention channel 44 which is defined by guide member 64 as well as inner surfaces 77 of protrusions 76 and the portion of the upper surface 79. In certain embodiments, inner surfaces 77 will feature a concave shape. Should pin be released from idler pin support 28 (the interaction of pin 50 and idler pin support 28 is described below), the concave shape of inner surfaces 77 will act to substantially direct pressure supplied by pin 50 to surfaces 77 in a direction transverse to the raising direction of securing element 30 so that securing element 30 is not raised to allow release of pin 50 from inner surfaces 77 of idler pin support 28. If securing element 30 were to raise, the concave shape of inner surfaces 77 would retain pin 50 such that pin 50 would raise and lower with securing element 30 and not be released therefrom.

Figure 4:
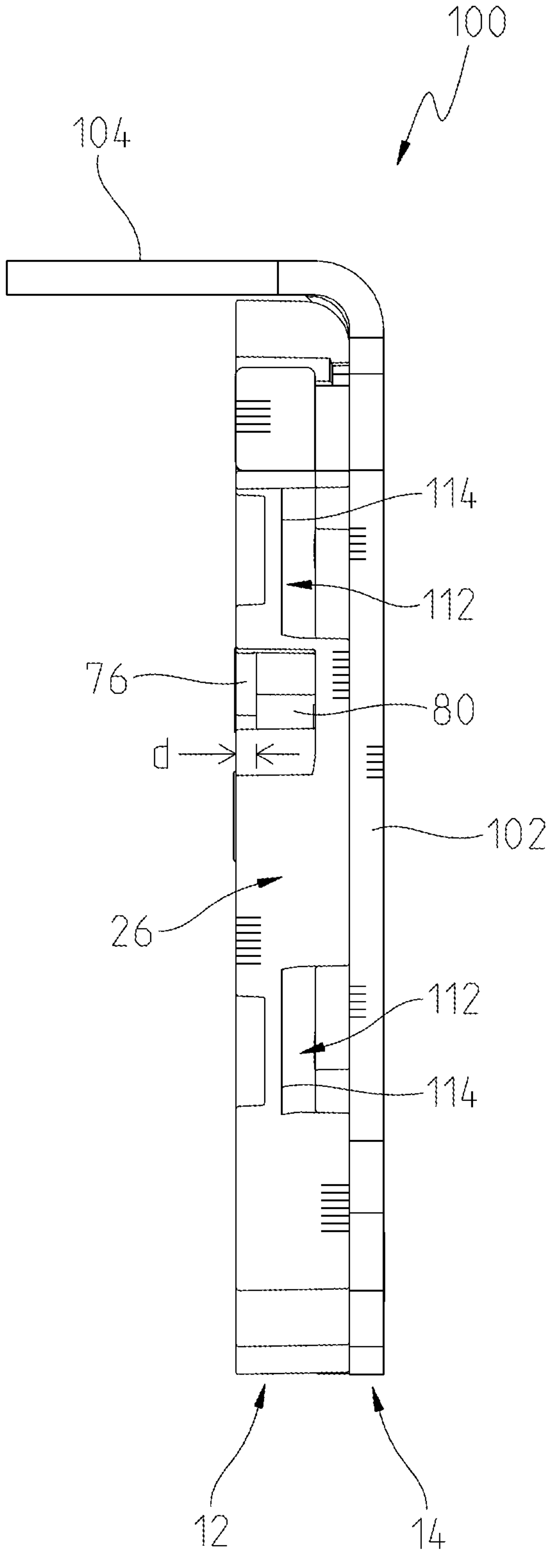
FIG. 4 is a right side elevational view of the housing assembly of FIG. 1.
Figure 5:
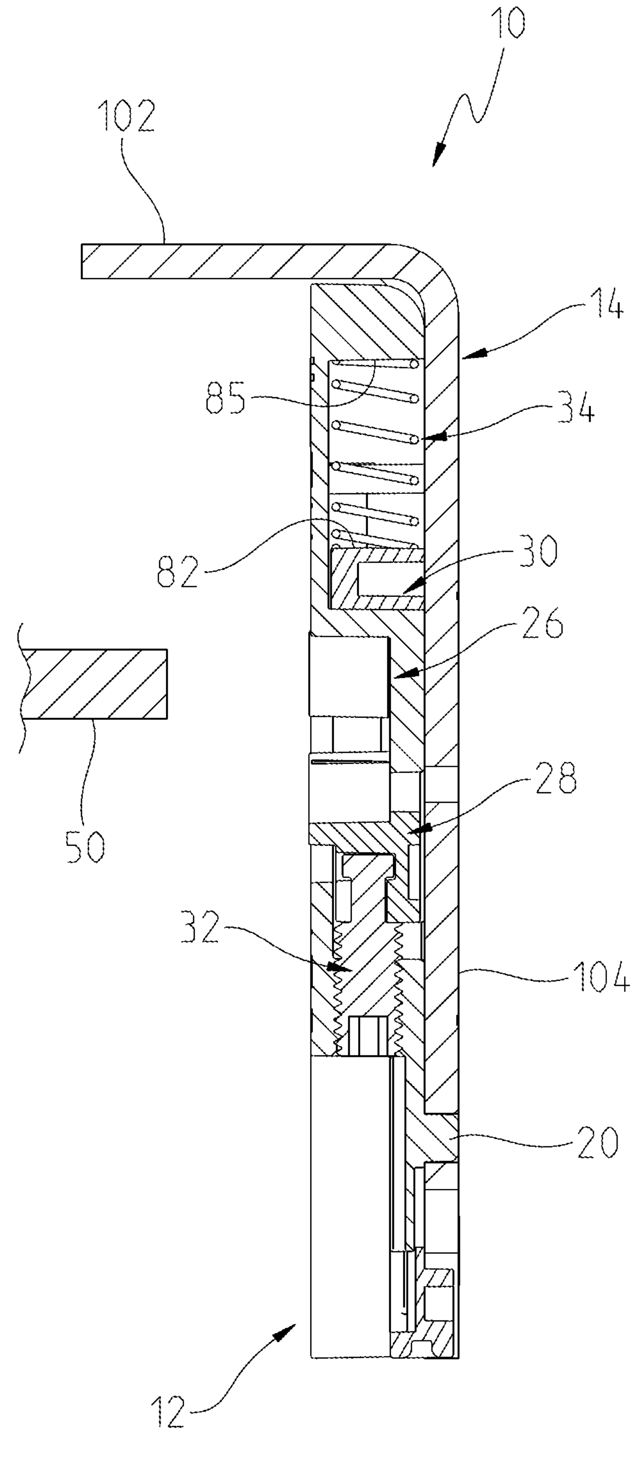
FIG. 5 is a cross-sectional view of the housing assembly of FIG. 1, taken along line 5-5 of FIG. 1.

Main portion 74 includes a pair of slanted surfaces 80 each of which extend upward and laterally outward from a position adjacent a lower, rear surface of one of front protrusions 74. Forward face 78 of main portion 74 is positioned rearward of front protrusions 76, such that a forward face 75 of front protrusions 76 is positioned a distance d forward of slanted surface 80 (FIG. 4). This distance allows securing element 30 to remain in a relaxed or closed configuration in the instance pin 50 is not sufficiently long enough to reach or contact slanted surfaces 80.

Upward-extending protrusions 72 of securing element 30 are positioned rearward of forward protrusion 70, and include an upward-facing surface 82 extending therebetween configured to engage with biasing member 34. Biasing member 34 is configured to be received within an indentation 84 (FIG. 3) in rear surface 25 of support 26, and extends between an upper surface 85 of indentation 84, which is downward-facing, and upward-facing surface 82 of securing element 30. Biasing member 34 biases securing element 30 into a closed configuration (FIG. 7), where protrusions 76 close off through channel 38 from retention channel 44.

With reference now to FIGS. 7-9D, when pin 50 is sufficiently long, pin 50 moves within one of channels 38, 46, or 48 towards retention channel 44. Once pin 50 comes in contact with slanted surface 80 within channel 38, pin 50 can slide along slanted surface 80 between a lower surface 86 of channel 38 and slanted surface 80 causing securing element 30 to translate up against the bias of biasing member 34 until securing element 30 is in an open configuration (FIG. 8) such that pin 50 can pass below protrusion 76 and into retention channel 44. Once pin 50 is past protrusion 76 and within retention channel 44, the bias of biasing member 34 returns securing element 30 to the relaxed or closed configuration (FIG. 7) securing pin 50 within retention channel 44.

Support 26 further includes channels 90 extending upward from through channel 38, which are configured to receive front protrusions 76 when securing element 30 is pushed upward into the open configuration by pin 50 during insertion. Channels 90 allow front protrusions 76 to be positioned partially or entirely above through channel 38. To remove pin 50 (and the roller connected thereto) from support assembly, the bottom surface of securing element 30 can receive an upward force in the direction of the arrow shown in FIG. 8. To facilitate supplying an upward force to securing element 30, a bottom surface thereof can include a feature, e.g., slot sized to receive a flat head screwdriver or other tool through which the upward force can be supplied.

Figure 6:
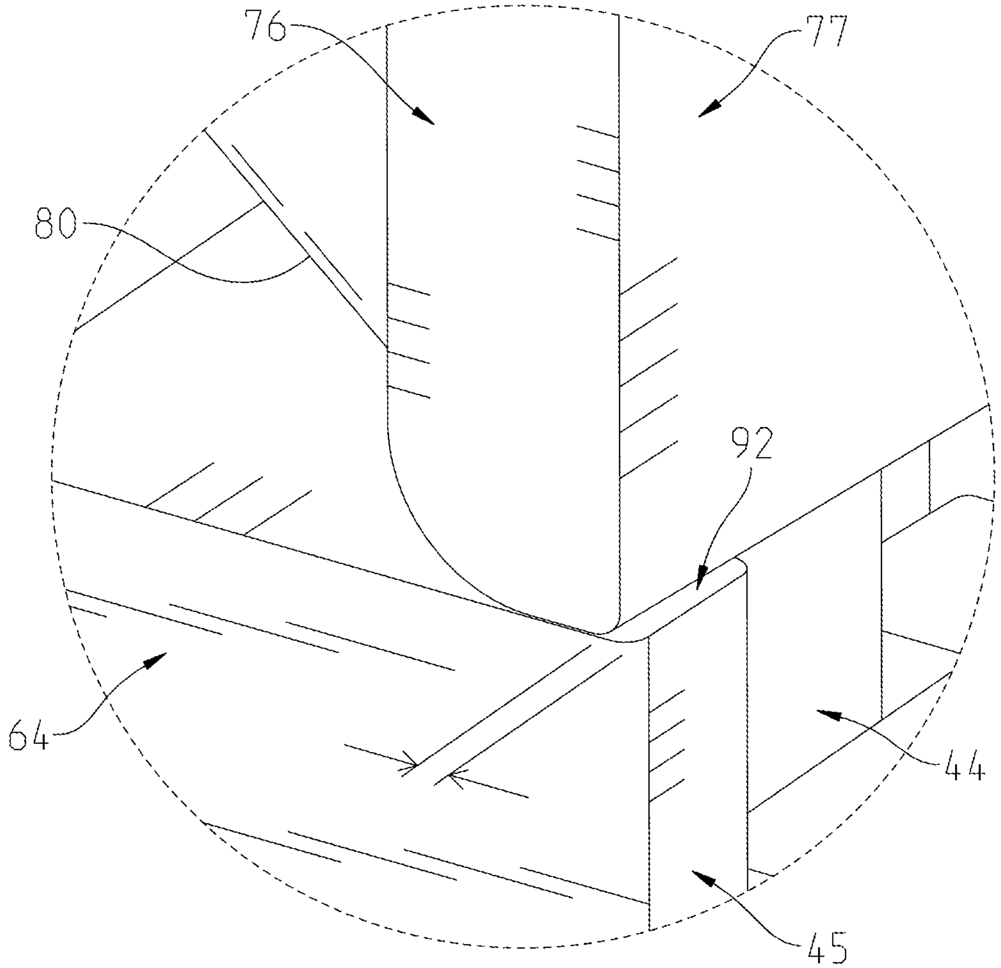
FIG. 6 is a detailed view of encircled area 6 of the housing assembly of FIG. 1.
Figure 7:
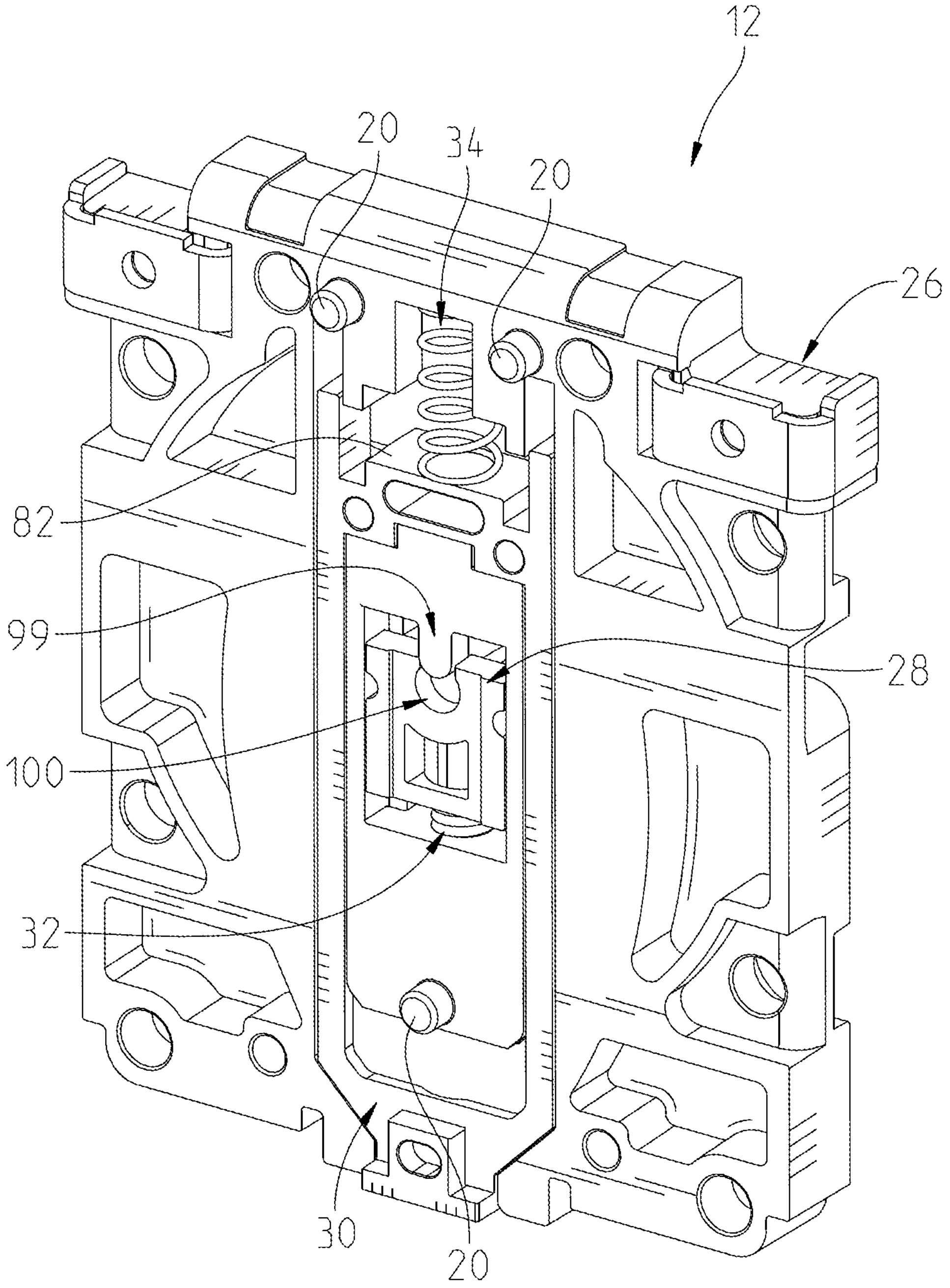
FIG. 7 is a rear perspective view of a support assembly of the housing assembly of FIG. 1 in a relaxed or closed position.
Figure 8:
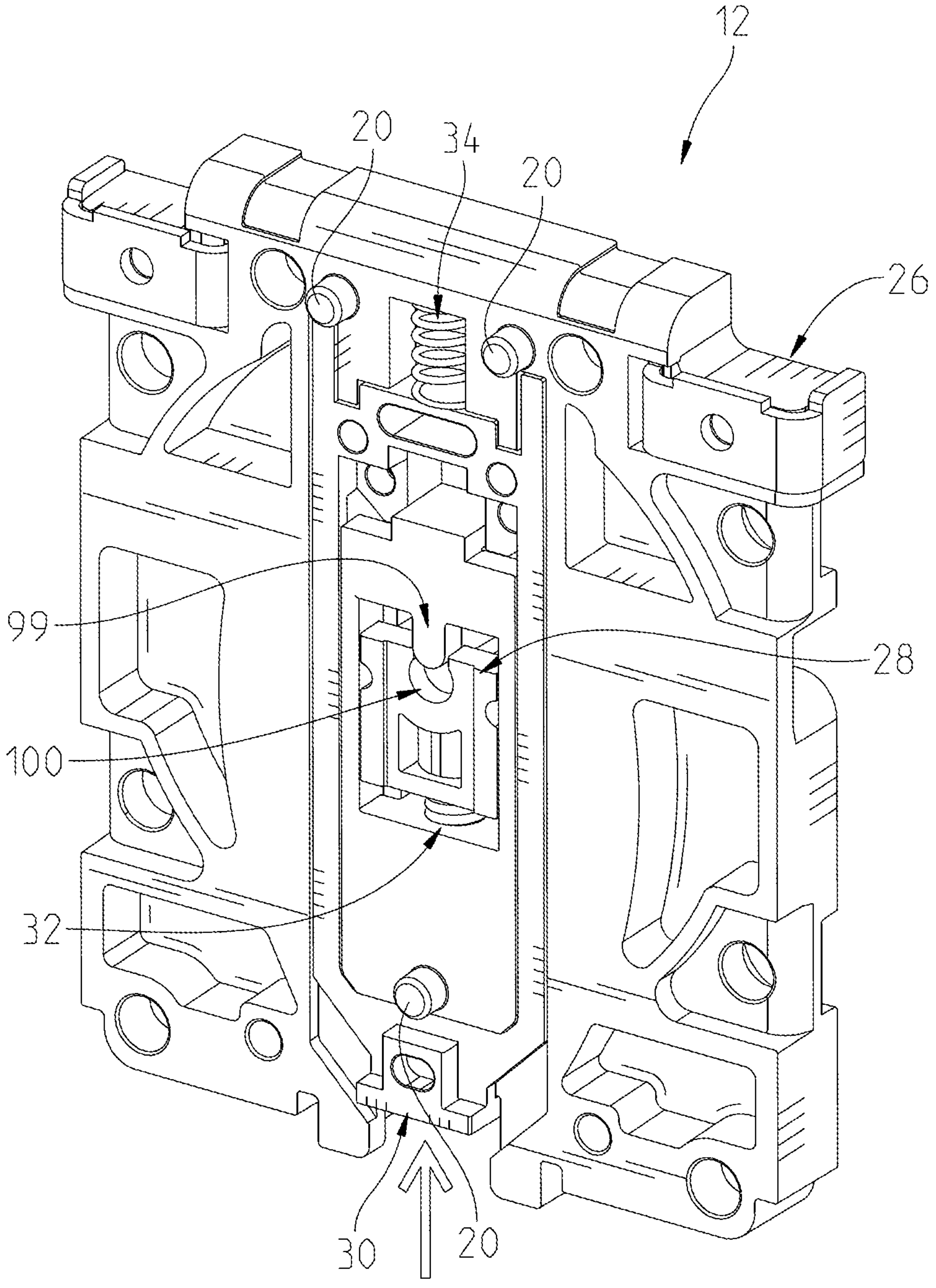
FIG. 8 is a rear perspective view of the support assembly of FIG. 7 in a fully actuated or open position.
Figure 9A:
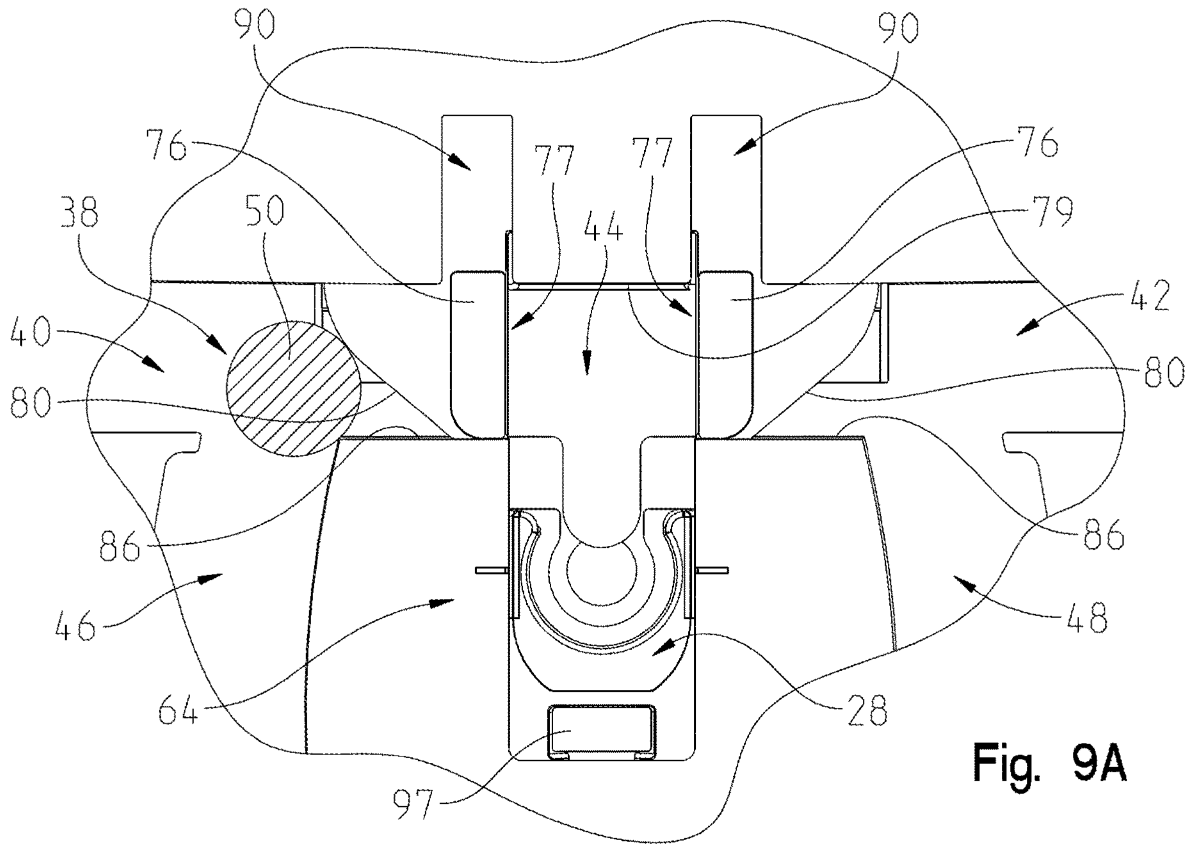
FIG. 9A is a front detailed view of the housing assembly of FIG. 1, where a pin of the idler end of the roller shade is entering a channel of the housing assembly and the housing assembly is in the relaxed or closed position.
Figure 9B:
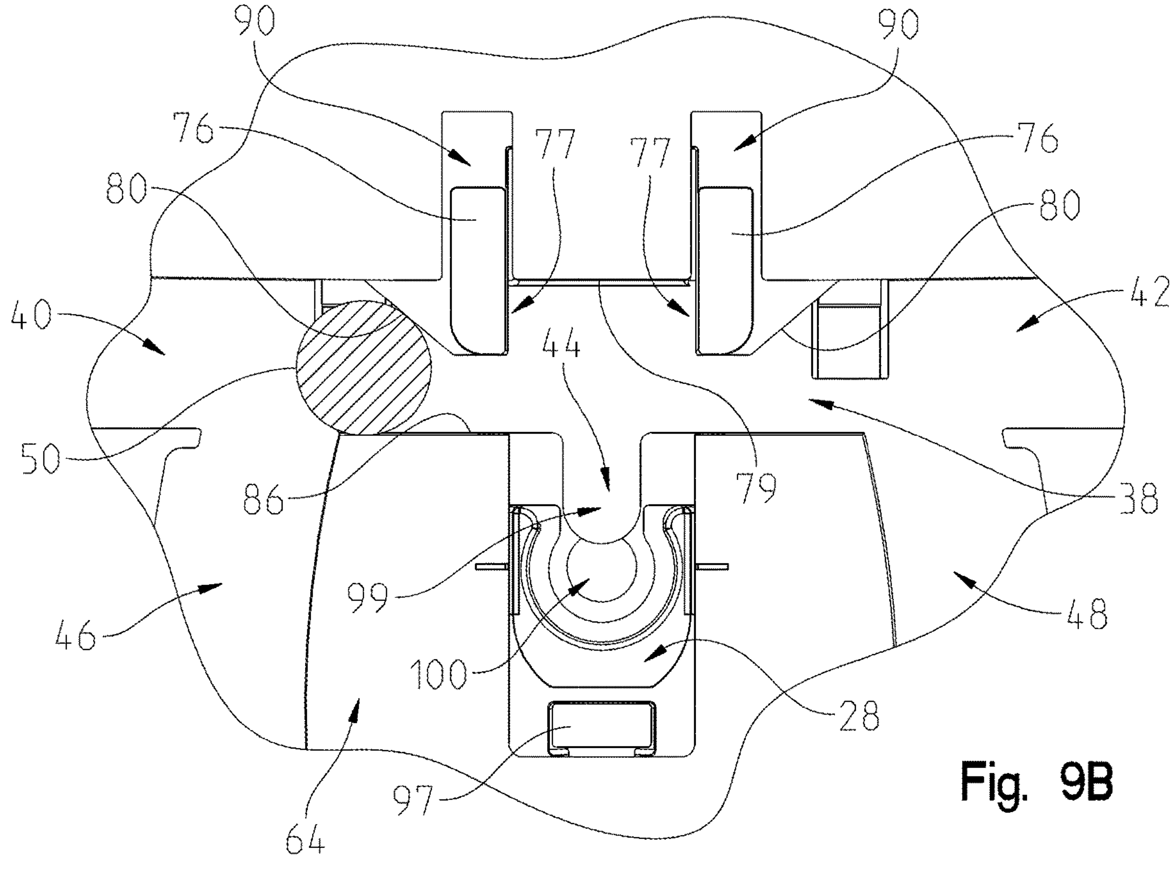
FIG. 9B is a front detailed view of the housing assembly of FIG. 1, where the pin of the idler end of the roller shade is in the channel of the housing assembly and the housing assembly is in a partially actuated or open position.
Figure 9C:
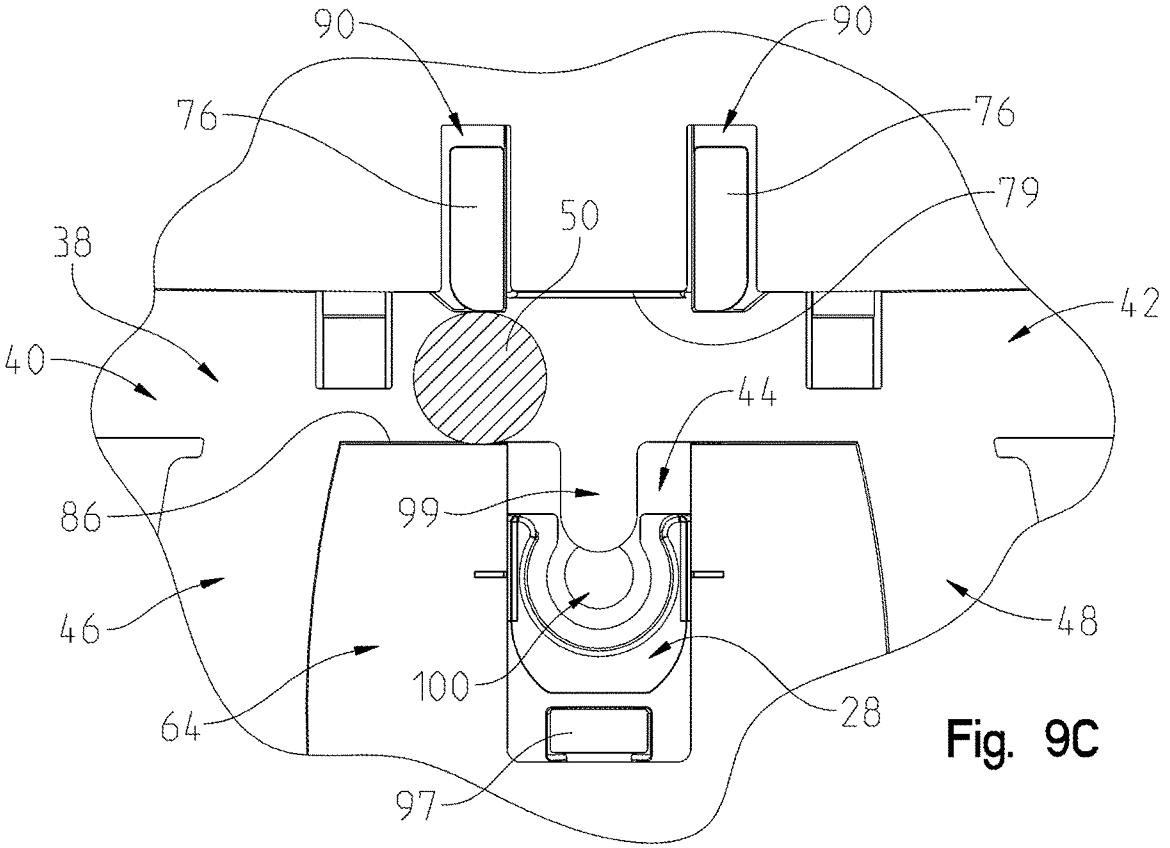
FIG. 9C is a front detailed view of the housing assembly of FIG. 1, where the pin of the idler end of the roller shade is in the channel of the housing assembly and the housing assembly is in the fully actuated or open position.
Figure 9D:
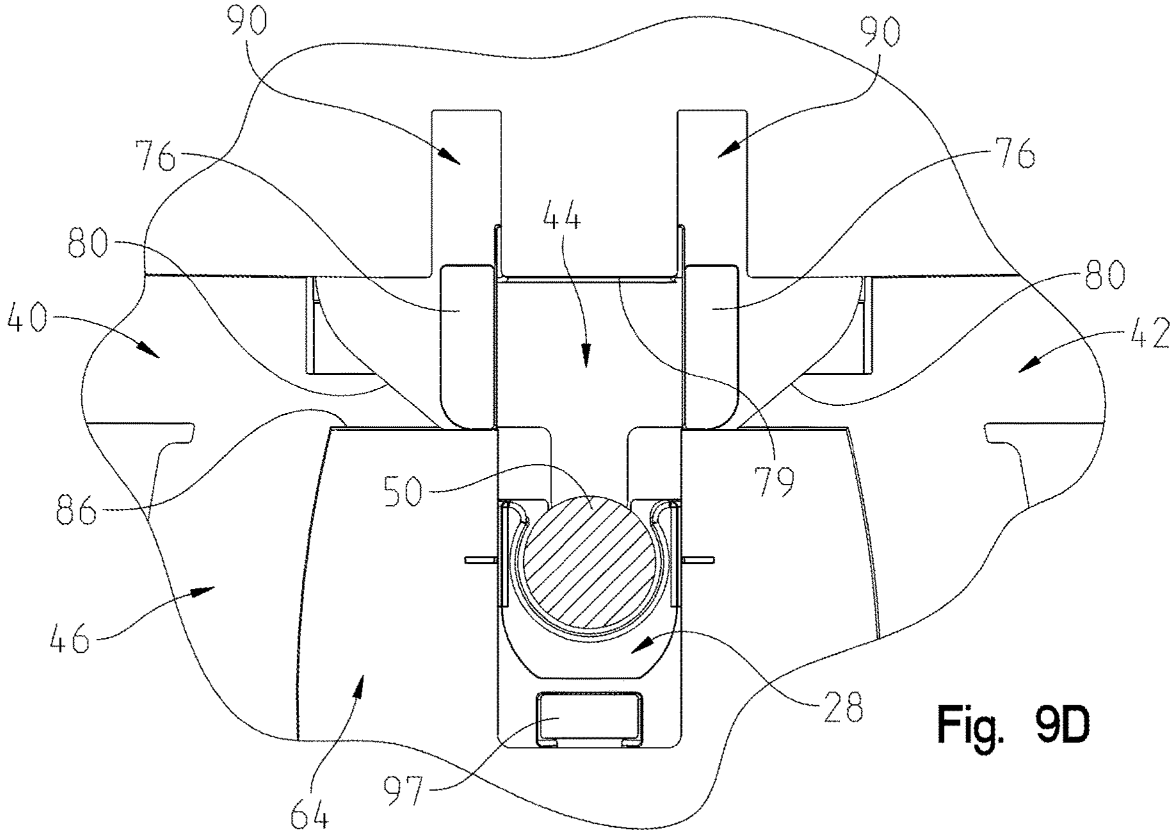
FIG. 9D is a front detailed view of the housing assembly of FIG. 1, where the pin of the idler end of the roller shade is in a retention channel of the housing assembly and the housing assembly is back in the relaxed or closed position.

Referring to FIG. 6, in various embodiments, front protrusions 76 are spaced apart in a laterally outward direction from inner surfaces 45 of retention channel 44 such that a lip 92 (FIG. 5) extends between inner surfaces 45 and front protrusions 76. Lip 92 prevents pin 50 from catching front protrusions 76 when retained within retention channel 44 and inadvertently raising securing element 30 thereby allowing pin 50 to exit retention channel 44.

With reference to FIGS. 1-3 and 7-9D, idler pin support 28 of support assembly 12 is configured to be supported within retention channel 44 in support 26, and to support and secure pin 50 within retention channel 44 when pin 50 is positioned within retention channel 44. Idler pin support 28 includes an upper opening 94 configured to receive pin 50 (FIG. 9D) and a lower opening 95 configured to receive an upper end 96 of height adjusting screw 32, which includes head 97 of height adjusting screw 32. Upper opening 94 of idler pin support 28 is an upward-facing U-shaped opening, while lower opening 95 of idler pin support 28 is a downward-facing opening shaped to mirror the shape of upper end 96 of height adjusting screw 32. Upper opening 94 is sized slightly smaller than the diameter of roller pin 50 so that roller pin 50 is constrained from exiting upper opening 94. Upper opening 94 can be made smaller than the diameter of roller pin 50 by extending the arcuate wall of idler pin support 28 against which roller pin 50 bears by more than 180°. Height adjusting screw 32 is threadingly coupled with an aperture 98 (FIG. 3) of guide member 64 of support 26 such that rotation of height adjusting screw 32 raises or lowers upper end 96 of height adjusting screw 32 relative to guide member 64. Upper end 96 of screw 32 is exposed within retention channel 44 while the remainder of screw 32 is concealed by guide member 64 (see FIG. 1). Based on the mirrored mating of upper end 96 of height adjusting screw 32 and lower opening 95 of idler pin support 28, the rotation of height adjustment screw 32 also raises or lowers idler pin support 28. In various embodiments, support 26 has a downward-extending protrusion 99 shaped to match an indentation 100 in idler pin support 28 such that protrusion 99 is configured to limit the upward movement of idler pin support 28. An advantage, among others, of this adjustability is to assist in raising or lowering the idler end of the roller to level the roller relative to the environment.

Referring now to FIGS. 1, 2 and 10-13, housing assembly 10 is configured to be coupled to the wall, window casing, or other similar structure (not shown) by receiving removable fasteners (e.g., screws) through one or more apertures 24 of mounting assembly 14. Mounting assembly 14 generally includes a main body portion 102 and a fixed bracket portion 104 extending from main body portion 102 that is configured to be removably coupled to a portion of the wall or window casing. Fixed bracket portion 104 may be integrally formed with main portion 102 of mounting assembly 14 or may be separate therefrom but fixedly coupled thereto.

As shown in FIGS. 1 and 10-13, housing assembly 10 extends laterally between first side 52 and a second side 54 and vertically between third side 60 and a fourth side 61 such that housing assembly 10 generally defines a rectangular or square shape. Any of sides 52, 54, 61 may include one or more fixed bracket portions 104 and, illustratively, fourth side 61 is integrally formed with fixed bracket portion 104.

Figure 10:
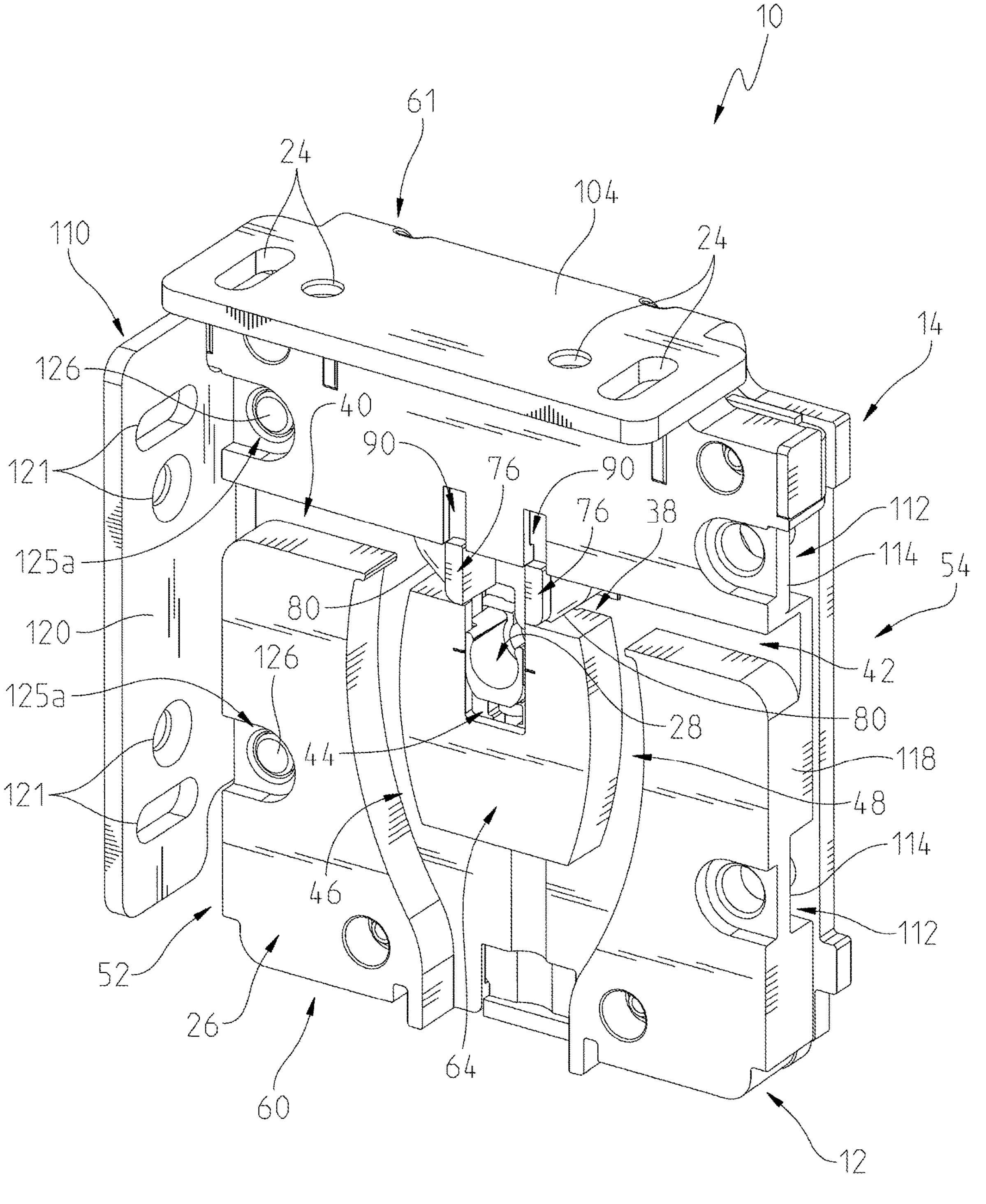
FIG. 10 is a front perspective view of the housing assembly of FIG. 1 with a left side removable mounting bracket attached.

Additionally, any of sides 52, 54, 60, 61 may be configured to couple with a removable bracket 110 (FIGS. 10 and 12), as disclosed further herein. More particularly, support assembly 12 and mounting assembly 14 cooperate with each other when coupled together to form receiving portions 112 for joining with removable bracket 110. Illustratively, as shown in FIGS. 1, 2 and 10, receiving portions 112 are defined by recesses 114 on support assembly 12 which, when mounting assembly 14 is coupled with support assembly 12, define receiving portions 112, illustratively slots. In one embodiment, housing assembly 10 includes two slots 112 along any of sides 52, 54, 60, 61 and slots 112 are spaced apart by a protrusion 118 on support assembly 12 which extends towards mounting assembly 14. In this way, when support assembly 12 is coupled to mounting assembly 14, protrusion 118 may contact mounting assembly 14 while recesses 114 of support assembly 12 are spaced apart therefrom to define receiving portions 112 as slots. Slots 112 are configured to receive at least a portion of removable bracket 110, as disclosed further hereinafter. In one embodiment, one or more of sides 52, 54, 60, 61 includes a single slot 112. In certain alternative embodiments, only left and right sides 52, 54 feature one or more slots 112.

Figure 11:
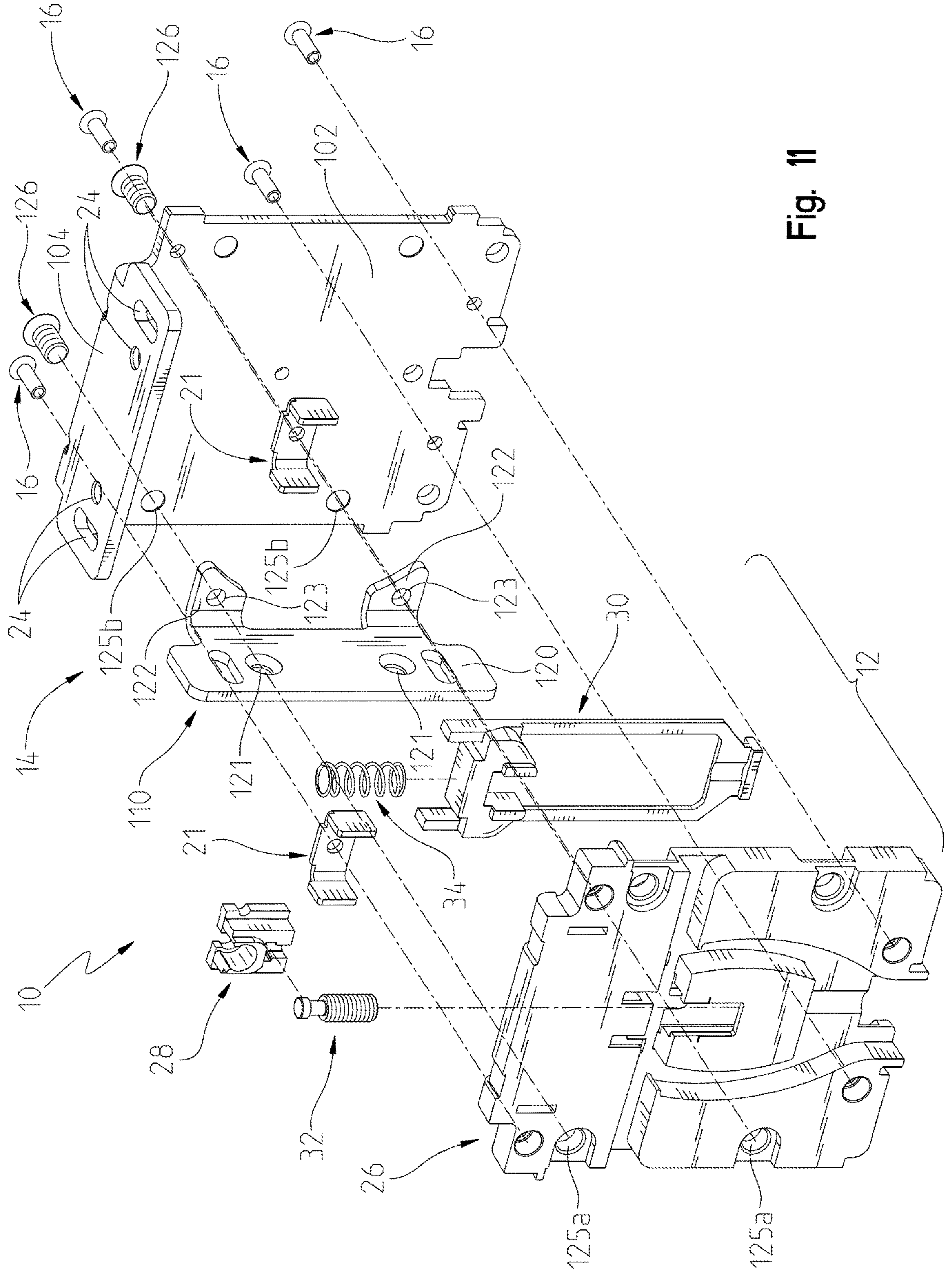
FIG. 11 is a front exploded view of the housing assembly and the left side removable mounting bracket of FIG. 10.
Figure 12:
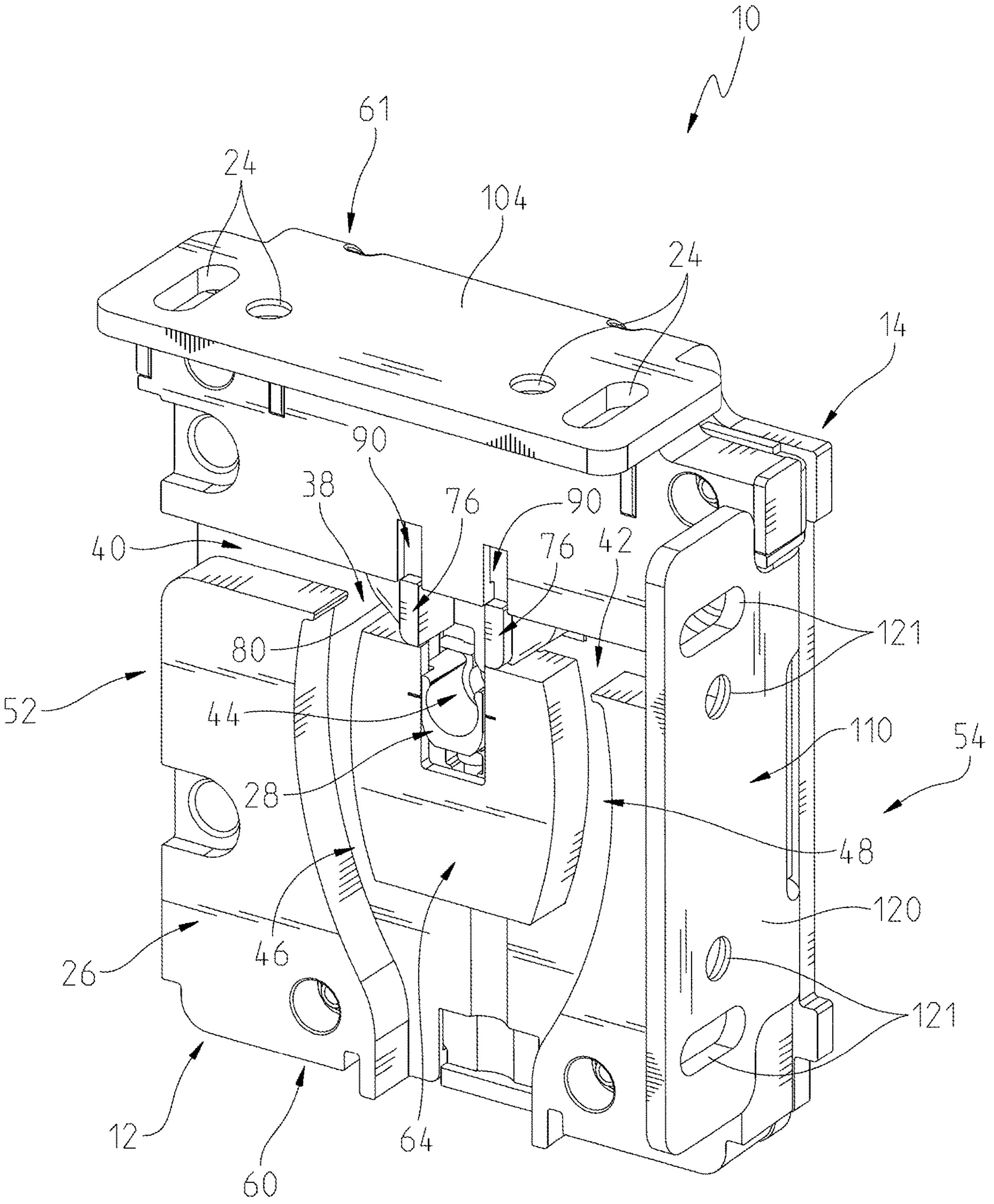
FIG. 12 is a front perspective view of the housing assembly of FIG. 1 with a right side removable mounting bracket attached.
Figure 13:
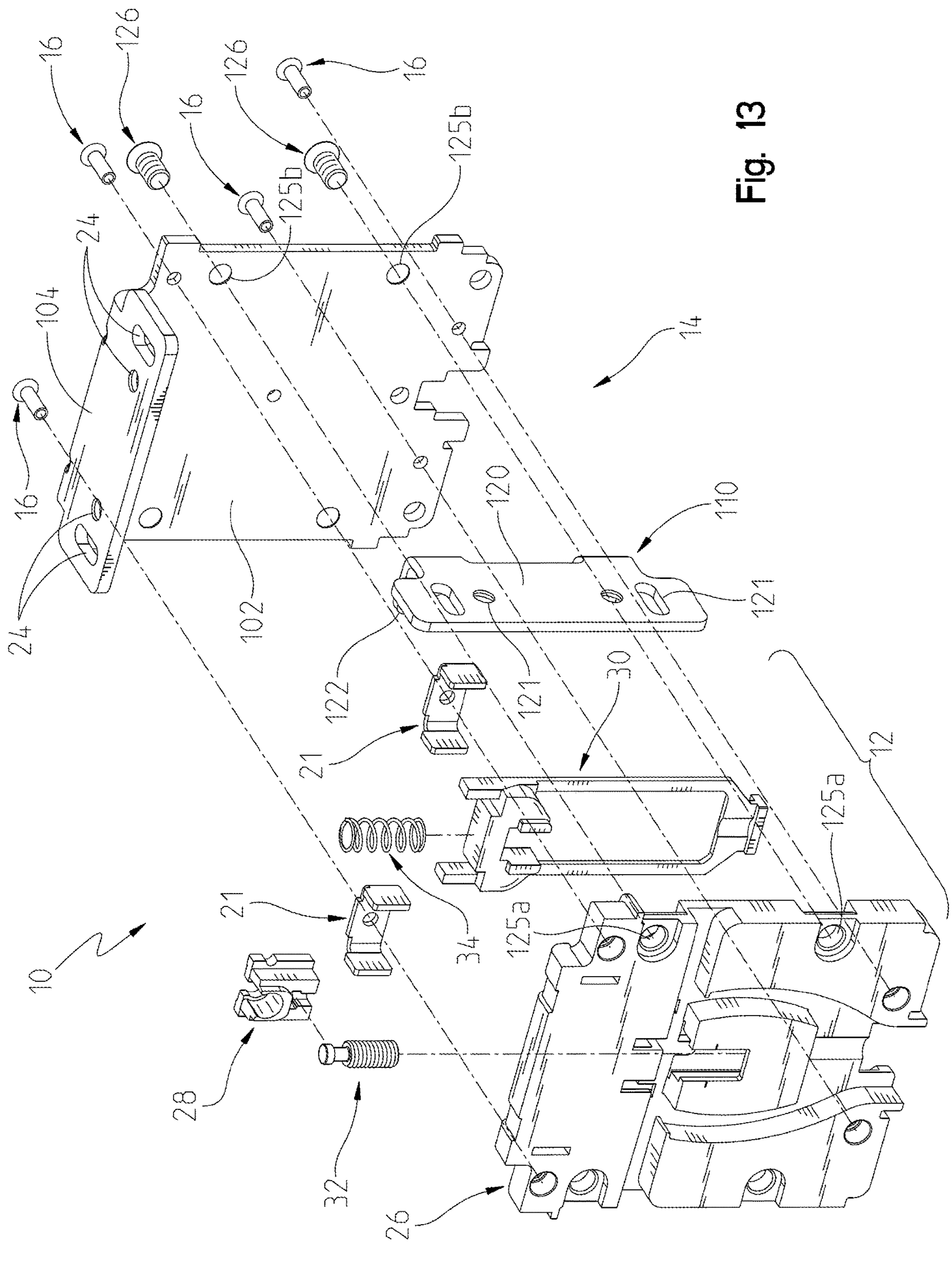
FIG. 13 is a front exploded view of the housing assembly and the right side removable mounting bracket of FIG. 12.

Referring to FIGS. 10-13, mounting assembly 14 is shown including removable bracket 110. Illustratively, as shown in FIGS. 10 and 11, removable bracket 110 may be coupled to housing assembly 10 along first or left side 52 and/or, as shown in FIGS. 12 and 13, removable bracket 110 may be coupled to housing assembly 10 along second or right side 54. Removable bracket 110 may be comprised of a rigid polymeric or metal material and includes a body portion 120 and at least one tab 122. Body portion 120 includes apertures 121 which are configured to receive removable fasteners (e.g., screws) to couple removable bracket 110 and housing assembly 10 to the window casing, wall, or other similar structure.

In one embodiment, and referring still to FIGS. 10-13, removable bracket 110 includes two tabs 122, each of which includes an aperture 123 (FIG. 10). Tabs 122 are generally perpendicular to body portion 120 and are configured to be received within slots 112 along first and/or second sides 52, 54 of housing assembly 10. In this way, tabs 122 are generally parallel to support assembly 12 and mounting assembly 14 and, when removable bracket 110 is coupled to housing assembly 10, body portion 120 is positioned generally perpendicularly to support assembly 12 and mounting assembly 14.

Removable bracket 110 is removably coupled to housing assembly 10 with removable fasteners 126 (e.g., screws) which are received through apertures 125*b* of mounting assembly 14, through apertures 123 of tabs 122, and terminate within a portion of apertures 125*a* of support assembly 12. In this way, one set of fasteners 126 may be used to couple together support assembly 12 and mounting assembly 14 of housing assembly 10 and simultaneously couple removable bracket 110 to housing assembly 10.

By using removable bracket 110 to couple housing assembly 10 to the window casing, wall, or other similar structure, the user or installer is able to support the roller on two surfaces because fixed bracket 104 may be coupled to a first surface and removable bracket 110 may be coupled to a second surface. In this way, regardless of the configuration of the wall, window casing, etc., removable bracket 110 can be positioned to either side of housing assembly 10 for coupling to the wall, window, etc. For example, fixed bracket 104 may be coupled to a horizontally oriented portion of a window casing while removable bracket 110 may be coupled to a vertically oriented portion of the window casing.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. A system for supporting an idler end of a roller shade which is rotatable about a longitudinal axis, the system comprising:

a support assembly configured to receive and secure the idler end, the support assembly comprising a support having a channel having a first entrance and a second entrance spaced apart from the first entrance; and a securing element received with an opening in the support, the securing element configured to translate between a closed position and an open position, the securing element including a front protrusion having a pair of forward protrusions configured to be received within the channel when the securing element is in the closed position and a pair of slanted surface extending from a position adjacent a lower, rear surface of the pair of forward protrusions, the securing element positioned between the first entrance of the channel and the second entrance of the channel, wherein a forward face of the slanted surfaces is spaced rearwardly of a forward face of the forward protrusions; and a mounting assembly coupled to the support assembly.

2. The system of claim 1, wherein the opening is in a rear surface of the support.

3. The system of claim 1, wherein the support includes a pair of channels configured to receive the pair of forward protrusions when the securing element is in the open position.

4. The system of claim 3, wherein the pair of channels extend upward from the channel.

5. The system of claim 4, wherein the pair of slanted surfaces are positioned within the channel when the securing element is in the closed position.

6. The system of claim 1, wherein at least a majority of the pair of slanted surfaces is configured to be positioned above an upper surface of the channel when the securing element is in the open position.

7. The system of claim 1, wherein the support further includes a retention channel, at least a portion of the retention channel extending downward from the channel, the pair of forward protrusions being positioned on either side of the retention channel.

8. The system of claim 7, wherein the support assembly further includes an idler end support configured to support the idler end in the retention channel.

9. The system of claim 1, wherein the support assembly further includes a biasing member configured to bias the support into the closed position.

10. The system of claim 1, wherein the pair of slanted surfaces extend laterally outward and upward.

11. The system of claim 1, wherein the support includes a first channel and a second channel, each of which are open to the first entrance of the channel and a third channel and a fourth channel, each of which are open to the second entrance of the channel.

12. A system for supporting an idler end of a roller clutch assembly for a fabric covering configured to rotate about an axis, the system comprising:

a support assembly configured to receive and secure the idler end, the support assembly comprising a support having a guide member and a through channel, the guide member defining at least a portion of a retention channel; and a securing element received with an opening in the support and configured to translate between a closed position and an open positioned, the securing element including a pair of forward protrusions configured to be received within the through channel when the securing element is in the closed position, wherein the retention channel is formed by the guide member, the pair of forward protrusions, and an upper surface of the through channel when the securing element is in the closed position; and a mounting assembly coupled to the support assembly.

13. The system of claim 12, wherein an inner surface of each of the pair of forward protrusions is spaced laterally outward from an inner surface of a portion of the retention channel defined by the guide member.

14. The system of claim 12, wherein at least a portion of the pair of forward protrusions is positioned above the through channel when the securing element is in the open position.

15. The system of claim 12, further comprising a biasing member biasing the securing element in the closed position.

16. The system of claim 12, further comprising an idler end support positioned within the retention channel.

17. The system of claim 16, further comprising an adjustment member configured to adjust a vertical position of the idler end support within the retention channel.

18. A method of securing an idler end of a roller shade within a housing assembly, the method comprising:

translating the idler end within a channel of the housing assembly towards a retention channel of the housing assembly;

contacting a slant surface of a securing element of the housing assembly with the idler end;

translating the idler end between the slant surface and a lower surface of the channel to transition the securing element into an open position;

translating the idler end below the slant surface when the securing element is in the open position;

positioning the idler end within the retention channel; and biasing the securing element into a closed position once the idler end is past the slant surface.

19. The method of claim 18, wherein the channel of the housing assembly includes a through channel extending from a first side of the housing assembly to a second side of the housing assembly.

20. The method of claim 18, wherein the channel includes a first portion extending in a generally vertical direction and a second portion extending in a generally horizontal direction.

21. The method of claim 18, wherein the retention channel extends in a generally vertical direction.

22. A system for supporting an idler end of a roller shade which is rotatable about a longitudinal axis, the system comprising:

a support assembly configured to receive and secure the idler end, the support assembly comprising a support having a channel extending from a first side of the support to a second side of the support; and a securing element received with an opening in the support, the securing element configured to translate between a closed position and an open position, the securing element including a front protrusion having a pair of forward protrusions configured to be received within the channel when the securing element is in the closed position and a pair of slanted surface extending from a position adjacent a lower, rear surface of the pair of forward protrusions, wherein a forward face of the slanted surfaces is spaced rearwardly of a forward face of the forward protrusions and at least a majority of the pair of slanted surfaces is configured to be positioned above an upper surface of the channel when the securing element is in the open position; and a mounting assembly coupled to the support assembly.

* * * * *